Patented Dec. 25, 1951

2,579,908

UNITED STATES PATENT OFFICE 2,579,908

AQUEOUS EMULSION POLYMERIZATION WITH LOW INITIAL SOAP CONCENTRATION

John A. Davison, Passaic, and Walter R. Dunn, West Englewood, N. J., assignors to United States Rubber Company, New York, N. Y., a corporation of New Jersey No Drawing. Application April 12, 1946, Serial No. 661,894

9 Claims. (Cl. 260—83.7)

This invention relates to improvements in the emulsion polymerization of polymerizable unsaturated monomers in the preparation of aqueous dispersions of various synthetic resins.

The manufacture of aqueous dispersions of various synthetic resins by the direct polymerization of polymerizable monomeric materials, such as polymerizable monoolefines and diolefines and mixtures thereof in aqueous emulsion in the presence of an emulsifying agent, is well known. It is, of course, desirable to obtain the highest concentration possible in the resultant aqueous emulsion polymerizate. The concentration of polymeric material that can be obtained in the final aqueous dispersion of polymeric material is limited in practice principally by the viscosity and yield value of the dispersion which must not be so high as to prevent adequate mixing and heat transfer being obtained in the emulsion polymerization process. The viscosity and yield point of an aqueous emulsion polymerizate decrease as the size of the particles of dispersed polymer increases, so that the larger the particle size that is produced in the emulsion polymerization process the lower will be the viscosity and yield values of the aqueous emulsion polymerizate, and the higher will be the concentration of polymer that can be obtained in the aqueous emulsion polymerizate.

According to the present invention, there are obtained, with soap as the emulsifying agent, aqueous dispersions of polymerized unsaturated monomers having lower viscosities and yield points and larger average particle size than similar emulsion polymerizates produced with the conventional amount of soap as the emulsifying agent (viz., about 5 parts of soap per 100 parts of polymerizable material).

In carrying out the present invention, the aqueous emulsion of polymerizable monomeric material is polymerized to between 10 and 60% conversion in the presence of 0.5 to 2 parts of soap per 100 parts of polymerizable monomers, as the emulsifying agent, after which the soap content of the emulsion is increased to at least 3 parts per 100 parts of polymerizable monomers originally present in the emulsion and the polymerization is continued to the desired final conversion of polymerizable monomers to polymeric material in the emulsion, usually 70 to 100% conversion. The conversion of polymerizable monomers, expressed in percent, is that proportion of the polymerizable monomeric materials initially present in the emulsion that has been converted into polymeric material. The 0.5 to 2 parts of soap per 100 parts of polymerizable monomers in the emulsion is sufficient soap to stabilize the emulsion during polymerization up to about 60% conversion, but is insufficient to stabilize the emulsion of polymers above 60% conversion, therefore the soap content must be increased to at least 3 parts per 100 parts of original polymerizable material at or before about 60% conversion in order to provide sufficient stabilization of the emulsion above 60% conversion of monomers. Generally, the soap content should be increased to between 3 and 6 parts per 100 parts of original polymerizable material. The purpose in using only a small amount of soap, from 0.5 to 2 parts per 100 parts of polymerizable monomers, at the start of the polymerization is to provide fewer micelles, which are the polymerization centers around which the polymer particles grow, so that the particles of polymer formed are fewer in an emulsion of low soap content and grow to a larger size than when a higher initial soap concentration with the increased number of polymerization centers is used. If more soap is not added at some time during the polymerization, by the time it has progressed to above 60% conversion the dispersion of polymeric material will be unstable, as shown by the separation of flocs of coagulum and with the possibility of complete flocculation. For the maximum average particle size and minimum viscosity and yield point, the original low soap concentration should be increased after the polymerization has progressed to such a stage that in a sample of the dispersion the monomers no longer separate out in a separate layer on standing. This is generally at around 25 to 30% conversion. However, a material increase in average particle size will result when the low initial soap concentration is increased at as low as 10% conversion.

It is known to prepare aqueous dispersions of synthetic resins of large particle size by polymerizing the emulsion of polymerizable materials in the presence of small quantities of soap, but such dispersions are unstable to mechanical action if they survive the polymerization to the conventional 70 to 100% conversion and have not already flocculated in the reactor. It has been suggested to supplement such low soap polymerizations with a surface-active stabilizer which does not produce micelles, such as the alkali-metal salts of sulfonated or sulfated hydrophilic organic bodies, e. g. sodium salt of isopropyl naphthalene sulfonic acid, dodecyl benzene sodium sulfonate, and sodium lauryl sulfate, or the reaction products of ethylene oxide and higher alcohols or alkylated phenols, e. g. reaction product of ethylene oxide and oleyl alcohol, and reaction product of ethylene oxide and isopropyl phenol. Where a volatile base soap is used as the soap emulsifier so that the synthetic resin coagulated from the dispersion, or articles made by direct deposition of the solids of such dispersion, will have low water-absorption characteristics and, in the case of electrical insulating materials, high electrical resistance properties, such additional surface-active agent, which in the dried resin leaves a water-absorbing or water-soluble residue, is an undesirable reagent from the point of view of the water absorption characteristics and electrical resistance properties of the dried product. The present invention, therefore, has an added advantage where the soap emulsifying agent is a volatile-base soap, but the present invention is not limited to the use of volatile-base soaps, since the advantage of a large particle size dispersion and a fluid dispersion of high solids content may be obtained by the process of the present invention using alkali-metal soaps as well as volatile-base soaps.

The soaps used as emulsifying agents in the present invention are the alkali soaps of soap-forming mono-carboxylic acids having 10 to 20 carbon atoms per molecule. Such a soap-forming acid may be a member of the saturated fatty acid series $(C_nH_{2n}O_2)$, or the unsaturated fatty acid series $(C_nH_{2n-2}O_2)$ or $(C_nH_{2n-4}O_2)$, or may be abietic acid (including the so-called hydrogenated abietic acid, dehydrogenated abietic acid, or polymerized abietic acid). Examples of such soap-forming acids of the fatty acid series are capric, undecenoic, lauric, myristic, palmitic, margaric, stearic, oleic, linoleic and arachidic acids. The volatile-base soaps which are preferred, as discussed above, are the soaps of the above soap-forming acids and "volatile alkalis," by which term is meant those alkalis having boiling points below 160° C. at atmospheric pressure. Examples of the volatile alkalis that may be used as the base in forming the soap are ammonia, and the volatile amines methylamine, ethylamine, dimethylamine, diethylamine, triethylamine, propylamine, dipropylamine, isopropylamine, di-isopropylamine, butyl primary amines, amyl primary amines, hexyl primary amines, cyclohexylamine, piperidine, 1-methyl-piperidine, 2-pipecoline, 3-pipecoline, 4-pipecoline, morpholine, and such mixed amines as methyl ethylamine, methyl propylamine, methyl butylamine, and methyl diethylamine. The soaps used in the present invention are not limited to the volatile-base soaps but may be other alkali soaps of soap-forming mono-carboxylic acids, such as the alkali-metal soaps, soaps of high boiling amines, e. g. tripropylamine, and the soaps of secondary and tertiary butyl, amyl, and hexyl amines; and soaps of hydroxyalkylamines, e. g., ethanolamine, diethanolamine and triethanolamine. The term "alkali soaps" is used herein in its commonly accepted sense as referring to alkali-metal soaps, ammonium soaps and amine soaps, and is exclusive of the alkaline-earth and other polyvalent metal salts of soap-forming acids. The term "alkali" similarly refers to alkali-metal, ammonium and amine radicals, and is exclusive of alkaline-earth and other polyvalent metal radicals.

Examples of polymerizable materials that are amenable to emulsion polymerization with initial low soap concentrations according to the present invention are styrenes, esters of acrylic acids, vinyl pyridine, vinyl esters of alkanoic acids, butadienes-1,3, and mixtures thereof. There may also be included in the emulsion of polymerizable monomers up to 10% by weight of polymerizable material of acrylonitrile, acrylic acids (including alkacrylic acids), and acrylamides (including alkacrylamides). The acrylonitrile, acrylic acids and acrylamides, if present, singly or in mixture, in amount more than 10 parts per 100 parts of polymerizable monomers in the emulsion to be polymerized will cause undue destabilization of the emulsion for the reason that they are too highly polar to adsorb enough soap at the low initial soap concentration to become stabilized particles in the emulsion. Examples of the styrenes referred to above are styrene itself (vinyl benzene), alpha-methyl styrene, p-methyl styrene, p-chlorostyrene, dichlorostyrenes. Examples of the esters of acrylic acid referred to above are the alkyl esters of acrylic acid and alkacrylic acids, e. g., methyl acrylate, methyl methacrylate, methyl ethacrylate, ethyl acrylate, ethyl methacrylate, ethyl ethacrylate. Examples of the vinyl esters of alkanoic acids referred to above are the various vinyl alkanoates, e. g., vinyl formate, vinyl acetate, vinyl propionate, vinyl butyrate.

In manufacturing aqueous dispersions of synthetic resins according to the present invention, the polymerizable monomers are emulsified in the requisite amount of water to give the desired solids concentration of resin in the final dispersion. The initial emulsifying agent is 0.5 to 2 parts of alkali soap per 100 parts of polymerizable monomers, and after conversion of 10 to 60% of the polymerizable monomers to polymeric material, the amount of soap is increased to at least 3 parts, and preferably to between 3 and 6 parts of soap per 100 parts of polymerizable monomers originally present in the emulsion. The 0.5 to 2 parts of soap originally present in the emulsion of monomers may be the saponification product of the alkali and soap-forming acid without any appreciable excess of soap-forming acid, in which case the amount of soap is increased after 10 to 60% conversion by addition of further soap so that the total amount is at least 3 parts per 100 parts of original monomers. It is preferred, however, to have additionally present in the original emulsion sufficient free soap-forming acid over that amount of acid which is saponified with alkali to give the original 0.5 to 2 parts of soap per 100 parts of polymerizable monomers, so that it is only necessary after the 10 to 60% conversion to add alkali to the emulsion to increase the soap concentration to 3 or more parts of soap per 100 parts of original monomers. The additional free soap-forming acid aids in stabilizing the emulsion without decreasing the average particle size. Generally 2 to 4 parts of free soap-forming acid per 100 parts of polymerizable material is sufficient. In order to reduce frothing, it is desirable to have an excess of free soap-forming acid present even after the increase in soap concentration.

The following examples illustrate the invention, both without excess soap-forming acid, and with a sufficient excess of soap-forming acid present in the original emulsion to permit the desired increase in soap content after 10 to 60% conversion solely by addition of the desired alkali to the emulsion. All parts indicated in the examples are parts by weight.

EXAMPLE I

An emulsion of 45 parts of butadiene-1,3 and 55 parts of styrene in 150 parts of water was prepared with 1 part of dimethylamine oleate as the emulsifier, 0.3 part of potassium persulfate as a conventional polymerization catalyst, and 0.25 part of dodecyl mercaptan as a conventional polymerization regulator. Duplicate portions of the emulsion were each polymerized by agitating at 50° C. for 6, 8, 10 and 12 hours respectively, at each of which times one of the duplicate portions was analyzed for polymer content in order to give the percentage conversion, and to the other duplicate portion was added 4 parts of dimethylamine oleate. The polymerization in each case where soap was added was then continued at 50° C. until the total polymerization time in each case was 16 hours. The percentage conversion at 6, 8, 10 and 12 hours was 11%, 17%, 38% and 50%, respectively. The conversion at the end of the 16 hours was about 90% in each case. In this and the other examples, the unreacted monomers were conventionally stripped from the reaction mixture at the end of the polymerization. The values of the average particle radius of the dispersed copolymer particles in the final dispersions where the soap content was increased from 1 part to 5 parts at 11%, 17%, 38% and 50% conversion were 0.08, 0.08, 0.07, and 0.08 micron, respectively, as compared with an average particle radius of about 0.04 micron for similar dispersions where the entire 5 parts of alkali soap per 100 parts of polymerizable material is present in the emulsion from the start of the polymerization.

EXAMPLE II

An emulsion of 45 parts of butadiene-1,3 and 55 parts of styrene in 140 parts of water containing 1 part of dimethylamine oleate, 0.3 part of potassium persulfate and 0.2 part of dodecyl mercaptan was polmerized at 50° C. for 12 hours, resulting in 50% conversion. The soap content was then increased by the addition of 4 parts of dimethylamine oleate. The polymerization was continued at 50° C. for a further six hours giving an 84% conversion. The average particle radius of the dispersed copolymer particles in the final dispersion was 0.08 micron.

EXAMPLE III

An emulsion of 45 parts of butadiene-1,3 and 55 parts of styrene in 150 parts of water was prepared with 1 part of dimethylamine oleate, 4 parts of free oleic acid, 0.3 part of persulfate, and 0.25 part of dodecyl mercaptan. Duplicate portions of the emulsion were each polymerized by agitating at 50° C. for 10, 12, 14 and 16 hours respectively, at each of which times one of the duplicate portions was analyzed for polymer content in order to determine the percentage conversion, and to each of the other duplicate portions was added 0.6 part of dimethylamine which was almost enough to neutralize the free oleic acid present. The polymerization in each case where dimethylamine was added was continued at 50° C. until the total polymerization time in each case was 30 hours. The percentage conversion at 10, 12, 14 and 16 hours was 32%, 44%, 57% and 59% respectively. The conversion at the end of the 30 hours was 71%, 98%, 91% and 93% respectively for the portions where the dimethylamine was added after 10, 12, 14 and 16 hours. The values of average particle radius of the dispersed copolymer particles in the final dispersions where the dimethylamine was added to neutralize the free oleic acid at 32%, 44%, 57% and 59% conversion were 0.08, 0.11, 0.09, and 0.11 micron respectively.

EXAMPLE IV

An emulsion of 45 parts of butadiene-1,3 and 55 parts of styrene in 150 parts water containing 1 part of dimethylamine oleate, 4 parts of free oleic acid, 0.3 part of potassium persulfate and 0.2 part of dodecyl mercaptan was polymerized at 50° C. for 10 hours, resulting in 48% conversion. The soap content was then increased by adding 0.6 part of dimethylamine which was enough to almost neutralize the 4 parts of free oleic acid. The polymerization was continued at 50° C. for a further 14 hours, giving an 84% conversion. The average particle radius of the dispersed copolymer particles in the final dispersion was 0.11 micron.

EXAMPLE V

An emulsion of 45 parts of butadiene-1,3 and 55 parts of styrene in 150 parts water containing 1 part of dimethylamine oleate, 4 parts of free oleic acid, 0.3 part of potassium persulfate, and 0.25 part of dodecyl mercaptan was polymerized at 50° C. for 12 hours to about 50% conversion. The soap content was then increased by adding 0.64 part of dimethylamine to neutralize the free oleic acid. The polymerization was continued at 50° C. for a further 12 hours, giving a 40.2% total solids dispersion at 99% conversion. A similar run was made with an initial concentration of 5 parts dimethylamine oleate in the emulsion. In this case the time of polymerization was 20 hours, giving a 40.0% total solids dispersion at 98% conversion.

Viscosity and yield point measurements of the first dispersion from the initial low soap emulsion were 14 cp. (centipoises) at 50° C. and 5 cg./cm.$^2$ (centigrams per square centimeter) at 50° C., as compared with viscosity and yield point measurements of 112 cp. at 50° C. and 31 cg./cm.$^2$ at 50° C. for the second dispersion from the initial emulsification on the 5 parts of soap. With the initial soap content of 5 parts per 100 parts of polymerizable material in the emulsion, the 150 parts of water were substantially the minimum amount that could be used, so that the 40% total solids dispersion was substantially the highest concentration that could be obtained by direct emulsification polymerization using the conventional 5 parts of soap initially in the emulsion. With the initial low soap concentration of 1 part according to the present invention, however, much less water could be used in the emulsion, thereby giving final emulsion polymerizates of higher concentration than 40% total solids with viscosity and yield point values better than or comparable to those obtained with the 5 parts initial soap content with 150 parts of water. In other runs with 125, 110 and 100 parts of water in the original emulsion with 1 part of dimethylamine oleate and 4 parts of oleic acid, polymerizing at 50° C. for 12 hours to about 50% conversion, adding 0.64 part of dimethylamine and continuing the polymerization for a further 12 hours, dispersions of 44.8%, 46.0% and 48.8% total solids respectively, at 100%, 95% and 97% conversions respectively, were obtained. The viscosity and yield point values of the 44.8% total solids dispersion were 24 cp. at 50° C. and 16 cg./cm.$^2$ at 50° C. The viscosity and yield point values of the 46.0% total solids dispersion were 84 cp. at 50° C. and 38 cg./cm.$^2$ at 50° C. The viscosity and yield point values of the 48.8% total solids dispersion were 77 cp. at 50° C. and 39 cg./cm.² at 50° C.

EXAMPLE VI

Emulsions of 45 parts of butadiene-1,3 and 55 parts of styrene in 150, 125, 100 and 90 parts of water, respectively, containing 1 part of dimethylamine "laureate," 4 parts of free "lauric" acid, 0.3 part of potassium persulfate and 0.25 part of dodecyl mercaptan were each polymerized at 50° C. for 14 hours to about 50% conversion. The "lauric" acid was a mixture of straight run coconut oil fatty acids. The soap contents were then increased by adding in each case 0.8 part of dimethylamine to neutralize the free "lauric" acid. The polymerizations were continued at 50° C. for a further 16 hours making the total polymerization time of 30 hours in each case.

A second series of runs was made on similar emulsions with 180, 175, 155 and 130 parts of water, respectively, per 100 parts of polymerizable material, but with initial soap contents in the emulsions of 5 parts of dimethylamine "laurate," and no free "lauric" acid. These emulsions were polymerized at 50° C. for 30 hours.

A third series of runs was made on similar emulsions with 150, 125, 100 and 70 parts of water, respectively, per 100 parts of polymerizable material, but with concentrations of 1.5 parts of triethylamine "laurate" and 4 parts of free "lauric" acid initially present in the emulsion. The emulsions were polymerized at 50° C. for 14 hours to about 50% conversion, after which 1.8 parts of triethylamine were added to almost neutralize the free "lauric" acid, and the polymerization was continued for a further 16 hours.

A fourth series of runs was made on similar emulsions with 150, 125, 100, 80 and 60 parts of water, respectively, per 100 parts of polymerizable material, but with concentrations of 1.2 parts of ethanolamine "laurate" and 3.9 parts of free lauric acid initially present in the emulsion. The emulsions were polymerized at 50° C. for 12 hours to about 50% conversion, after which 1.1 parts of ethanolamine were added to almost neutralize the free "lauric" acid, and the polymerization was continued for a further 15 hours.

Viscosity and yield point values on the final resin dispersions in the first, second, third and fourth series of runs are shown in the following Tables I to IV, respectively:

*Table I.—Low initial dimethylamine laurate concentration*

| Parts water per 100 parts polymerizable material in original emulsion | 150 | 125 | 100 | 90 |
|---|---|---|---|---|
| Per Cent Conversion | 100 | 100 | 100 | 100 |
| Per Cent Total Solids | 39.8 | 43.8 | 50.2 | 52.4 |
| Viscosity (cp. at 50° C.) | 7 | 11 | 28 | 50 |
| Yield point (cg./cm.² at 50° C.) | 2 | 2 | 9 | 31 |
| Ave. particle radius (microns) | 0.12 | 0.14 | | |

*Table II.—High initial dimethylamine laurate concentration*

| Parts water per 100 parts polymerizable material in original emulsion | 180 | 175 | 155 | 130 |
|---|---|---|---|---|
| Per Cent Conversion | 98 | 96 | 97 | 90 |
| Per Cent Total Solids | 36.2 | 36.1 | 39.2 | 41.2 |
| Viscosity (cp. at 50° C.) | 39 | 34 | 71 | 92 |
| Yield point (cg./cm.² at 50° C.) | 1 | 2 | 16 | 47 |
| Ave. particle radius (microns) | | 0.09 | | |

*Table III.—Low initial triethylamine laurate concentration*

| Parts water per 100 parts polymerizable material in original emulsion | 150 | 125 | 100 | 70 |
|---|---|---|---|---|
| Per Cent Conversion | 94 | 93 | 92 | 94 |
| Per Cent Total Solids | 38.4 | 42.2 | 46.9 | 55.8 |
| Viscosity (cp. at 50° C.) | 7 | 5 | 8 | 118 |
| Yield point (cg./cm.² at 50° C.) | 0.7 | 0.2 | 0.7 | 116 |

*Table IV.—Low initial ethanolamine laurate concentration*

| Parts water per 100 parts polymerizable material in original emulsion | 150 | 125 | 100 | 80 | 60 |
|---|---|---|---|---|---|
| Per Cent Conversion | 98 | 100 | 100 | 100 | 100 |
| Per Cent Total Solids | 39.4 | 44.4 | 50.2 | 56.1 | 63.2 |
| Viscosity (cp. at 50° C.) | 6 | 9 | 17 | 39 | 93 |
| Yield point (cg./cm.² at 50° C.) | 0 | 0.4 | 2 | 16 | 11 |

EXAMPLE VII

Emulsions of 45 parts of butadiene-1,3 and 55 parts of styrene in 150, 125, 100, 90, 80 and 70 parts of water, respectively, containing 1.4 parts of ethanolamine caprate, 4 parts of free capric acid, 0.6 part of potassium persulfate and 0.25 part of dodecyl mercaptan were each polymerized at 55° C. for 12 hours to about 50% conversion. The soap contents were then increased to a total of 6.8 parts by adding in each case 1.44 parts of ethanolamine to neutralize the free capric acid. The polymerizations were continued at 55° C. for a further 16 hours, making the total polymerization time 28 hours in each case. Similar runs were made with 175, 150, 130, 120 and 100 parts of water respectively, and 0.3 part of potassium persulfate but with initial soap contents in the emulsions of 6.8 parts of ethanolamine caprate. These emulsions were polymerized at 55° C. for 15 hours, which was sufficient time for substantially complete conversion at the high initial soap contents.

Viscosity, yield point, and in some cases average particle radius, measurements are shown in the following tables, Table I giving the values for the low initial soap concentrations of 1.4 parts according to the present invention, and Table II giving the values for the conventional high initial soap concentration of 6.8 parts:

*Table I.—Low initial soap concentration*

| Parts water per 100 parts polymerizable material in original emulsion | 150 | 125 | 100 | 90 | 80 | 70 |
|---|---|---|---|---|---|---|
| Per Cent Conversion | 95 | 100 | 100 | 100 | 100 | 98 |
| Per Cent Total Solids of final dispersion | 38.6 | 43.6 | 50.0 | 52.0 | 55.8 | 57.4 |
| Viscosity (cp. at 50° C.) | 10 | 25 | 24 | 98 | 82 | 127 |
| Yield point (cg./cm.² at 50° C.) | 0 | 3 | 3 | 16 | 12 | 13 |
| Ave. particle radius (micron) | | 0.10 | 0.09 | 0.11 | 0.11 | 0.11 |

*Table II.—High initial soap concentration*

| Parts water per 100 parts polymerizable material in original emulsion | 175 | 150 | 130 | 120 | 100 |
|---|---|---|---|---|---|
| Per Cent Conversion | 99 | 97 | 100 | 97 | 95 |
| Per Cent Total Solids of final dispersion | 36.2 | 39.2 | 43.0 | 45.2 | 48.2 |
| Viscosity (cp. at 50° C.) | 9 | 18 | 25 | 85 | 324 |
| Yield point (cg./cm.² at 50° C.) | 0 | 2 | 9 | 10 | 155 |
| Ave. particle radius (micron) | 0.07 | | | 0.08 | |

EXAMPLE VIII

An emulsion of 67 parts of 2,5-dichlorstyrene and 33 parts of butadiene-1,3 in 80 parts of water containing 1.4 parts of ethanolamine caprate, 4 parts of free capric acid, 0.6 part of potassium persulfate and 0.25 part of dodecyl mercaptan was polymerized at 55° C. for 10 hours to about 50% conversion. The soap content was then increased to 6.8 parts by adding 1.44 parts of ethanolamine to neutralize the free capric acid. The polymerization was continued at 55° C. for a further 15 hours. A similar run was made with 120 parts of water and 0.3 part of potassium persulfate but with an initial soap content in the emulsion of 6.8 parts of ethanolamine caprate. This emulsion was polymerized at 55° C. for 15 hours. The first dispersion from the low initial soap concentration gave a 50.2% total solids dispersion at 88% conversion. The viscosity and yield point values were 14 cp. at 50° C. and 0.6 cg./cm.$^2$ at 50° C. The average particle radius was over 0.10 micron. The second dispersion from the high initial soap concentration gave a 41.8% total solids dispersion at 91% conversion. The viscosity and yield point values were 24 cp. at 50° C. and 22 cg./cm.$^2$ at 50° C. The average particle radius was 0.07 micron.

EXAMPLE IX

An emulsion of 53 parts of methyl alpha-methacrylate and 47 parts of butadiene-1,3 in 80 parts of water containing 1.4 parts of ethanolamine caprate, 4 parts of free capric acid, 0.6 part of potassium persulfate and 0.25 part of dodecyl mercaptan was polymerized at 55° C. for 7 hours to about 50% conversion. The soap content was then increased to 6.8 parts by adding 1.44 parts of ethanolamine to neutralize the free capric acid. The polymerization was continued at 55° C. for a further 10 hours. A similar run was made with 120 parts of water and 0.3 part of potassium persulfate but with an initial soap content in the emulsion of 6.8 parts of ethanolamine caprate. This emulsion was polymerized at 55° C. for 15 hours.

The first dispersion from the low initial soap concentration gave a 55.0% total solids dispersion at 100% conversion. The viscosity and yield point values were 38 cp. at 50° C. and 15 cg./cm.$^2$ at 50° C. The average particle radius was 0.10 micron. The second dispersion from the high initial soap concentration gave a 45.2% total solids dispersion at 100% conversion. The viscosity and yield point values were 116 cp. at 50° C. and 32 cg./cm.$^2$ at 50° C. The average particle radius was 0.08 micron.

EXAMPLE X

An emulsion of 51 parts of isoprene and 49 parts of styrene in 80 parts of water containing 1.4 parts of ethanolamine caprate, 4 parts of free capric acid, 0.6 part of potassium persulfate and 0.25 part of dodecyl mercaptan was polymerized at 55° C. for 20 hours to about 50% conversion. The soap content was then increased to 6.8 parts by adding 1.44 parts of ethanolamine to neutralize the free capric acid. Polymerization was continued at 55° C. for a further 17 hours. A similar run was made with 120 parts of water and 0.3 part of potassium persulfate but with an initial soap content in the emulsion of 6.8 parts of ethanolamine caprate. This emulsion was polymerized at 55° C. for 15 hours which gave a similar percentage conversion at the high initial soap concentration to that obtained with a 20 hour polymerization at the low initial soap concentration followed by 17 hours' additional polymerization after increase of the soap content.

The first dispersion from the low initial soap concentration gave a 43.6% total solids dispersion at 72% conversion. The viscosity and yield point values were 21 cp. at 50° C. and 3 cg./cm.$^2$ at 50° C. The average particle radius was over 0.08 micron. The second dispersion from the high initial soap concentration gave a 34.8% of total solids dispersion at 73% conversion. The viscosity and yield point values were 186 cp. at 50° C. and 20 cg./cm.$^2$ at 50° C. The average particle radius was 0.05 micron.

The above examples are merely illustrative of the invention and various other resins may be prepared on initial low soap concentration in the emulsion of polymerizable monomers which may be selected from butadienes-1,3, styrenes, esters of acrylic acids, vinyl pyridine, vinyl esters of alkanoic acids, mixtures of any of the foregoing, and mixtures thereof with up to 10%, on the weight of polymerizable material in the emulsion, of acrylonitrile, acrylic acids and acrylamides. The reduction in viscosity and yield point values, and increase in the average particle size of synthetic resin dispersions according to the present invention, is clearly shown in the above examples. Examples of other resins that will show improved characteristics of the dispersions made according to the present invention, are those prepared from 50 parts of styrene and 50 parts of methyl, alpha-methacrylate; 75 parts of isoprene, 25 parts of vinyl pyridine; 75 parts of butadiene-1,3, 15 parts of styrene, and 10 parts of acrylonitrile.

In view of the many changes and modifications that may be made without departing from the principles underlying the invention, reference should be made to the appended claims for an understanding of the scope of the protection afforded the invention.

Having thus described our invention, what we claim and desire by Letters Patent is:

1. In the polymerization, with soap as the emulsifying agent, of an aqueous emulsion of polymerizable monomeric material of the group consisting of styrenes, esters of acrylic acids, vinyl pyridine, vinyl esters of alkanoic acids, and butadienes-1,3, and mixtures thereof with up to 10%, on the weight of polymerizable material in the emulsion, of material of the group consisting of acrylonitrile, acrylic acids, and acrylamides, the steps of initially carrying out the polymerization in the presence of 0.5 to less than 1.5 parts of dimethylamine oleate per 100 parts of polymerizable monomers until conversion of 30 to 60% of the polymerizable monomers into polymeric material has taken place, thereafter increasing the soap content to 3 to 6 parts of dimethylamine oleate per 100 parts of polymerizable monomers originally present in the emulsion, and continuing the polymerization to 70–100% conversion of polymerizable monomers to polymeric material.

2. In the polymerization, with soap as the emulsifying agent, of an aqueous emulsion of polymerizable monomeric material of the group consisting of styrenes, esters of acrylic acids, vinyl pyridine, vinyl esters of alkanoic acids, and butadienes-1,3, and mixtures thereof with up to 10%, on the weight of polymerizable material in the emulsion, of material of the group consisting of acrylo-nitrile, acrylic acids, and acrylamides, the steps of initially carrying out the polymerization in the presence of 0.5 to less than 1.5 parts of volatile base soap of soap-forming monocarboxylic acid having 10 to 20 carbon atoms in the molecule per 100 parts of polymerizable monomers until conversion of 30 to 60% of the polymerizable monomers into polymeric material has taken place, thereafter increasing the soap content to 3 to 6 parts of volatile base soap of soap-forming monocarboxylic acid having 10 to 20 carbon atoms in the molecule per 100 parts of polymerizable monomers originally present in the emulsion, and continuing the polymerization to 70 to 100% conversion of polymerizable monomers to polymeric material.

3. In the polymerization, with soap as the emulsifying agent, of an aqueous emulsion of polymerizable monomeric material of the group consisting of styrenes, esters of acrylic acids, vinyl pyridine, vinyl esters of alkanoic acids, and butadienes-1,3, and mixtures thereof with up to 10%, on the weight of polymerizable material in the emulsion, of material of the group consisting of acrylonitrile, acrylic acids, and acrylamides, the steps of initially carrying out the polymerization in the presence of 0.5 to less than 1.5 parts of alkali soap of soap-forming carboxylic acid having 10 to 20 carbon atoms in the molecule per 100 parts of polymerizable monomers until conversion of 10 to 60% of the polymerizable monomers into polymeric material has taken place, thereafter increasing the soap content to an amount sufficient to maintain the stability of the emulsion, and continuing the polymerization to 70 to 100% conversion of original polymerizable monomers to polymeric material.

4. In the polymerization, with soap as the emulsifying agent, of an aqueous emulsion of a mixture of butadiene-1,3 and styrene, the steps of initially carrying out the polymerization in the presence of 0.5 to less than 1.5 parts of alkali soap of soap forming carboxylic acid having 10 to 20 carbon atoms in the molecule per 100 parts of polymerizable monomers until a conversion of 10 to 60% of the polymerizable monomers to polymeric material has taken place, thereafter increasing the soap content to 3 to 6 parts of alkali soap of soap forming carboxylic acid having 10 to 20 carbon atoms in the molecule per 100 parts of polymerizable monomers originally present in the emulsion, and continuing the polymerization to 70 to 100% conversion of polymerizable monomers to polymeric material.

5. In the polymerization, with soap as the emulsifying agent, of an aqueous emulsion of a mixture of butadiene-1,3 and styrene, the steps of initially carrying out the polymerization in the presence of 0.5 to less than 1.5 parts of alkali soap of soap-forming carboxylic acid having 10 to 20 carbon atoms in the molecule per 100 parts of polymerizable monomers until a conversion of 30 to 60% of the polymerizable monomers to polymeric material has taken place, thereafter increasing the soap content to 3 to 6 parts of alkali soap of soap-forming carboxylic acid having 10 to 20 carbon atoms in the molecule per 100 parts of polymerizable monomers originally present in the emulsion, and continuing the polymerization to 70 to 100% conversion of original polymerizable monomers to polymeric material.

6. The method which comprises subjecting to polymerization an aqueous emulsion of polymerizable monomeric material of the group consisting of styrenes, esters of acrylic acids, vinyl pyridine, vinyl esters of alkanoic acids, and butadienes-1,3, and mixtures thereof with up to 10%, on the weight of polymerizable material in the emulsion, of material of the group consisting of acrylonitrile, acrylic acids, and acrylamides, in the presence of 0.5 to less than 1.5 parts of alkali soap of soap-forming monocarboxylic acid having 10 to 20 carbon atoms in the molecule per 100 parts of polymerizable monomers until conversion of 30 to 60% of the polymerizable monomers into polymeric material has taken place, thereafter increasing the soap content to 3 to 6 parts of alkali soap of soap-forming monocarboxylic acid having 10 to 20 carbon atoms in the molecule per 100 parts of polymerizable monomers originally present in the emulsion, and continuing the polymerization to 70 to 100% conversion of original polymerizable monomers to polymeric material.

7. The method which comprises subjecting to polymerization an aqueous emulsion of polymerizable monomeric material of the group consisting of styrenes, esters of acrylic acids, vinyl pyridine, vinyl esters of alkanoic acids, and butadienes-1,3, and mixtures thereof with up to 10%, on the weight of polymerizable material in the emulsion, of material of the group consisting of acrylonitrile, acrylic acids, and acrylamides, in the presence of 0.5 to less than 1.5 parts of volatile base soap of soap-forming monocarboxylic acid having 10 to 20 carbon atoms in the molecule and 2 to 4 parts of free soap-forming monocarboxylic acid having 10 to 20 carbon atoms in the molecule per 100 parts of polymerizable monomers until conversion of 30 to 60% of the polymerizable monomers into polymeric material has taken place, thereafter adding a volatile base to increase the soap content to 3 to 6 parts of volatile base soap of soap-forming monocarboxylic acid having 10 to 20 carbon atoms in the molecule per 100 parts of polymerizable monomers originally present in the emulsion, and continuing the polymerization to 70 to 100% conversion of original polymerizable monomers to polymeric material.

8. The method which comprises subjecting to polymerization an aqueous emulsion of polymerizable monomeric material of the group consisting of styrenes, esters of acrylic acids, vinyl pyridine, vinyl esters of alkanoic acids, and butadienes-1,3, and mixtures thereof with up to 10%, on the weight of polymerizable material in the emulsion, of material of the group consisting of acrylonitrile, acrylic acids, and acrylamides, in the presence of 0.5 to less than 1.5 parts of alkali soap of soap-forming monocarboxylic acid having 10 to 20 carbon atoms in the molecule and 2 to 4 parts of free soap-forming monocarboxylic acid having 10 to 20 carbon atoms in the molecule per 100 parts of polymerizable monomers until conversion of 10 to 60% of the polymerizable monomers into polymeric material has taken place, thereafter adding alkali to increase the soap content to 3 to 6 parts per 100 parts of polymerizable monomers originally present in the emulsion, and continuing the polymerization to 70 to 100% conversion of polymerizable monomers to polymeric material.

9. In the aqueous polymerization of a butadiene-1,3 hydrocarbon with soap as the emulsifying agent, the steps of initially carrying out the polymerization in the presence of 0.5 to less than 1.5 parts of an alkali soap of a soap forming carboxylic acid having 10 to 20 carbon atoms in the molecule per 100 parts of polymerizable monomers until a conversion to polymeric material of about 50% has taken place, thereafter increasing the soap content to an amount sufficient to maintain the stability of the emulsion, and continuing the polymerization to about 70 to 100% conversion.

JOHN A. DAVISON.
WALTER R. DUNN.

REFERENCES CITED

The following references are of record in the file of this patent:

UNITED STATES PATENTS

| Number | Name | Date |
|---|---|---|
| 2,333,403 | Youker | Nov. 2, 1943 |
| 2,434,536 | Arundale | Jan. 13, 1949 |

OTHER REFERENCES

Siggia et al.: India Rubber World, pages 436–441, January 1945.

Powers: "Synthetic Resins and Rubbers," pages 208 and 209 (Wiley, 1943).